United States Patent
Kawai et al.

(10) Patent No.: US 6,171,417 B1
(45) Date of Patent: Jan. 9, 2001

(54) PROPERTY RECOVERING METHOD FOR NI-BASE HEAT RESISTANT ALLOY

(75) Inventors: Hisataka Kawai; Yoshinao Hibaru; Ikuo Okada; Takayuki Imazu, all of Takasago (JP)

(73) Assignee: Mitsubishi Heavy Industries, Ltd., Tokyo (JP)

(*) Notice: Under 35 U.S.C. 154(b), the term of this patent shall be extended for 0 days.

(21) Appl. No.: 09/253,435

(22) Filed: Feb. 19, 1999

(30) Foreign Application Priority Data

Feb. 23, 1998 (JP) .................................................. 10-055740

(51) Int. Cl.[7] ....................................................... C21D 9/00
(52) U.S. Cl. ................................................................. 148/675
(58) Field of Search ................................... 148/675, 677, 148/410, 428

(56) References Cited

U.S. PATENT DOCUMENTS

| | | | | |
|---|---|---|---|---|
| 3,898,109 | * | 8/1975 | Shaw ..................................... | 148/675 |
| 4,624,716 | * | 11/1986 | Noel et al. ........................... | 148/675 |
| 4,753,686 | | 6/1988 | Company et al. . | |
| 5,900,084 | * | 5/1999 | DeLuca et al. ...................... | 148/675 |

FOREIGN PATENT DOCUMENTS

| | | |
|---|---|---|
| 119 618 | 5/1976 | (DE) . |
| 0 184 949 | 6/1986 | (EP) . |
| 6-057359 | 3/1994 | (JP) . |
| 2066702 | 9/1996 | (RU) . |

OTHER PUBLICATIONS

*Rejuvenation of Turbine Blade Material by Thermal Treatment*, M. D. Ross et al.; Chemical Abstracts, vol. 93, No. 6, Aug. 11, 1980.

European Search Report (with Annex) for EP 99 30 1222, completed May 11, 1999, by N. Gregg.

* cited by examiner

*Primary Examiner*—Deborah Yee
(74) *Attorney, Agent, or Firm*—Alston & Bird LLP

(57) ABSTRACT

There is provided a property recovering method which can be applied to a high-temperature member whose properties such as strength and ductility have been deteriorated by the long-term use at a high temperature to recover its properties to those before the use, enable its reuse, and contribute to the effective use of resources and the conservation of environment. A Ni-base heat resistant alloy having a particular composition, whose properties have been deteriorated by heat history, is subjected to first-stage solution treatment, in which the alloy is held at a temperature of 1175 to 1225° C. for 1 to 5 hours and then furnace-cooled, then subjected to second-stage solution treatment, in which the alloy is held at a temperature of 1115 to 1165° C. for 1 to 5 hours and then air-cooled, and further subjected to aging treatment, in which the alloy is held at a temperature of 810 to 860° C. for 22 to 26 hours.

10 Claims, 1 Drawing Sheet

PROPERTY RECOVERING METHOD FOR NI-BASE HEAT RESISTANT ALLOY

BACKGROUND OF THE INVENTION

1. Field of the Invention

The present invention relates to a property recovering method for a Ni-base heat resistant alloy whose properties such as strength and ductility have been deteriorated by use at a high temperature.

2. Description of the Related Art

A Ni-base heat resistant alloy which has a γ' intermetallic compound of $Ni_3$ (Al, Ta, Ti) as a main ingredient and also has a solid solution strengthening function given by precipitation hardening of the second phase and Mo, W, or the like has been used for a high-temperature member such as a moving blade of gas turbine and jet engine. Here, the second phase is a phase containing an intermetallic compound, carbide, and the like. The aforesaid Ni-base heat resistant alloys include a Ni-base heat resistant alloy disclosed in Japanese Patent Provisional Publication No. 6-57359 (No. 57359/1994) (hereinafter referred to as alloy A) and a Ni-base heat resistant alloy commercially available under the tradename Inconel 738 (hereinafter referred to as alloy B). The compositions of these alloys A and B are given in Table 1.

In order to solve the above problems, the inventors have earnestly studied a property recovering method for a Ni-base heat resistant alloy whose properties have been deteriorated by the long-term use at a high temperature. As a result, we found that the properties can be recovered by performing two-stage solution treatment at a predetermined temperature on the alloy having deteriorated properties and then by performing aging treatment thereon, and completed the present invention.

A first mode of the present invention is a property recovering method for a Ni-base heat resistant alloy, in which a Ni-base heat resistant alloy containing, in percent by weight, 13.1–15% Cr, 8.5–10.5% Co, 1–3.5% Mo, 3.5–4.5% W, 3–5.5% Ta, 3.5–4.5% Al, 2.2–3.2% Ti, 0.06–0.12% C, 0.025% or less B, 0.01–0.05% Zr, 1–100 ppm Mg and/or Ca, and 0–1.5% Hf, the balance being Ni and unavoidable impurities, whose properties have been deteriorated by heat history, is subjected to first-stage solution treatment, in which the alloy is held at a temperature of 1175 to 1225° C. for 1 to 5 hours and then furnace-cooled, then subjected to second-stage solution treatment, in which the alloy is held at a temperature of 1115 to 1165° C. for 1 to 5 hours and then air-cooled, and further subjected to aging treatment, in which the alloy is held at a temperature of 810 to 860° C. for 22 to 26 hours.

A second mode of the present invention is a property recovering method for a Ni-base heat resistant alloy, in

TABLE 1

Chemical composition of material subjected to property recovering treatment in accordance with the present invention (wt %)

| Element | Cr | Co | Mo | W | Ta | Al | Ti | C | B |
|---|---|---|---|---|---|---|---|---|---|
| Alloy A | 13.1–15 | 8.5–10.5 | 1–3.5 | 3.5–4.5 | 3–5.5 | 3.5–4.5 | 2.2–3.2 | 0.06–0.12 | 0.025 or less |
| Alloy B | 15.7–16.3 | 8–9 | 1.5–2 | 2.4–2.8 | 1.5–2 | 3.2–3.7 | 3.2–3.7 | 0.09–0.13 | 0.007–0.012 |

| Element | Zr | Mg/Ca | Hf | Nb | Fe | Mn | Si | S | Ni |
|---|---|---|---|---|---|---|---|---|---|
| Alloy A | 0.01–0.05 | 1–100 ppm | 1.5 or less | — | — | — | — | — | Balance |
| Alloy B | 0.03–0.08 | — | — | 0.6–1.1 | 0.05 or less | 0.02 or less | 0.3 or less | 0.015 or less | Balance |

Note)
Al + Ti: 6.5–7.2 (Alloy B)

For the Ni-base heat resistant alloy of this type, the second phase (intermetallic compound, carbide, etc.) is coarsened or the diffusion and condensation of impurity elements take place because of heat history due to the long-term use at a high temperature, by which the strength and ductility are decreased. Therefore, the member using such an alloy becomes incapable of being used, and finally must be scrapped because of the formation of cracks. Also, these Ni-base heat resistant alloys are generally very expensive.

SUMMARY OF THE INVENTION

The present invention has been made in view of the aforementioned situation of the prior art, and accordingly an object of the present invention is to provide a property recovering method which can be applied to a high-temperature member such as a blade member that must be scrapped due to the deterioration of properties such as strength and ductility caused by the long-term use at a high temperature to recover its properties to those before the use, enable its reuse, and contribute to the effective use of resources and the conservation of environment.

which a Ni-base heat resistant alloy containing, in percent by weight, 15.7–16.3% Cr, 8–9% Co, 1.5–2% Mo, 2.4–2.8% W, 1.5–2% Ta, 3.2–3.7% Al, 3.2–3.7% Ti, 0.09–0.13% C, 0.007–0.012% B, 0.03–0.08% Zr, 0.6–1.1% Nb, 0.05% or less Fe, 0.02% or less Mn, 0.3% or less Si, and 0.015% or less S (where Al+Ti: 6.5–7.2%), the balance being Ni and unavoidable impurities, whose properties have been deteriorated by heat history, is subjected to first-stage solution treatment, in which the alloy is held at a temperature of 1175 to 1225° C. for 1 to 5 hours and then furnace-cooled, then subjected to second-stage solution treatment, in which the alloy is held at a temperature of 1115 to 1165° C. for 1 to 5 hours and then air-cooled, and further subjected to aging treatment, in which the alloy is held at a temperature of 810 to 860° C. for 22 to 26 hours.

By performing heat treatment in accordance with the method of the present invention, the properties of a Ni-base heat resistant alloy whose properties such as strength and ductility have been deteriorated by the second phase coarsened by heat history can be recovered to the state before being subjected to heat history.

Also, the present invention enables the reuse of a member that had to be scrapped conventionally, and can contribute to the saving and effective use of expensive metallic elements and further to the conservation of environment.

DETAILED DESCRIPTION OF PREFERRED EMBODIMENTS

Figure 1:
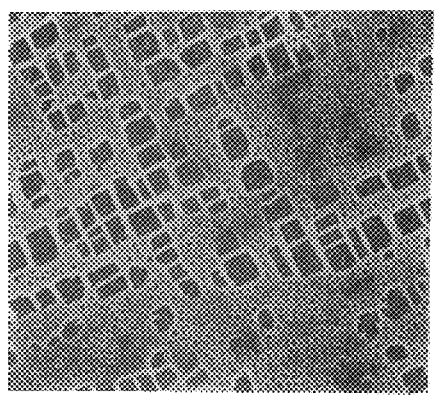
FIG. 1 is a microphotograph of ×5000 magnification showing a microstructure of a Ni-base heat resistant alloy (test material No. 7) subjected to property recovering treatment in accordance with the present invention after its property is deteriorated by being subjected to heat history.

The Ni-base heat resistant alloys, whose properties have been deteriorated by receiving heat history, subjected to property recovering treatment in accordance with the present invention are the Ni-base heat resistant alloy described in Japanese Patent Provisional Publication No. 6-57359 (No. 57359/1994) (alloy A) and the Ni-base heat resistant alloy commercially available under the tradename Inconel 738 (alloy B). Their compositions are in the range of chemical components shown in the aforementioned Table 1. General heat treatment conditions in manufacturing are as follows: After being held at 1120° C. for two hours, the alloy is air-cooled to room temperature. Thereafter, it is held at 850° C. for 24 hours, and then air-cooled to room temperature (hereinafter indicated by 1120° C.×2 h/air cooling+850° C.×24 h/air cooling).

If these Ni-base heat resistant alloys are heated for a long period of time in a temperature range of 700 to 1000° C., which is a normal service temperature of high-temperature members for which these alloys are used, the second phase (including intermetallic compound and carbide) deposited at grain boundary and in grain grows and coarsens, so that the strength and ductility are decreased remarkably, which disenables the continuous use of alloys. Therefore, with the method in accordance with the present invention, first-stage solution treatment, in which the material is held at a high temperature such that the second phase is solid dissolved, is first performed on a member such as a blade whose component is an alloy in which the properties such as strength and ductility have been deteriorated, by which the second phase is solid dissolved again. Thereafter, by performing second-stage solution treatment and aging treatment, the second phase is deposited again, by which the properties such as strength and ductility are recovered to those equal to the properties of unused (unheated) material.

For the first-stage solution treatment for solid dissolving the second phase again, if the temperature is too high, the grain boundary or dendrite boundary is melted locally, so that the member is sometimes deformed. On the other hand, if the temperature is low, the second phase is not solution dissolved sufficiently, and when the second-stage solution treatment and aging treatment are performed, the provision of strength and ductility cannot be expected. Therefore, the temperature for re-solid dissolution in the first-stage solution treatment is preferably 1200±25° C. (1175 to 1225° C.). This temperature range is also one in which furnace cooling control is possible. The holding time of heating temperature depends on the size of the member and the situation of furnace. However, if the holding time is 1 hour or shorter, the elements are not diffused sufficiently, so that the recovery of properties is insufficient. If the holding time is increased to 5 hours or longer, the recovery shows a saturating state. Therefore, the proper holding time is 1 to 5 hours considering the cost.

On the other hand, the second-stage solution treatment and aging treatment are processes for re-depositing the second phase. Depending on the combination of the temperature and the holding time, the second phase becomes coarse or fine, so that the strength and ductility equal to those of unused (unheated) material cannot be obtained. For this reason, it is necessary to deposit a proper quantity of the second phase of a proper size to obtain the strength and ductility equal to those of unused (unheated) material. For this purpose, the second-stage solution treatment and aging treatment must be performed under proper conditions. Therefore, a proper temperature for the second-stage solution treatment is 1140±25° C. (1115 to 1165° C.), and a proper temperature for the aging treatment is 835±25° C. (810 to 860° C.), which is generally used from the previous experience. A proper holding time is 1 to 5 hours for the second-stage solution treatment and 24±2 hours (22 to 26 hours) for the aging treatment.

Next, the method in accordance with the present invention will be described in more detail with reference to this embodiment.

EXAMPLES

Round bars (diameter: 15 mm, length: 90 mm) of alloy A and alloy B having chemical compositions shown in Table 2 were used as experimental materials. As shown in Table 3, the materials (test materials of Nos. 2 and 9) whose properties have been deteriorated by heating at 900° C. for 10,000 hours were subjected to the first-stage solution treatment or the second-stage solution treatment and then the aging treatment. Five types of reheated materials (test materials Nos. 3 to 7) for alloy A and two types of re-heat treated materials (test materials Nos. 10 and 11) for alloy B were prepared. The holding time for solution treatment was constant, being 2 hours, and only the heating temperature for the first-stage solution treatment was made an experimental parameter. The aging treatment was performed under the same conditions of 850° C. and 24 hours.

On the re-heat treated materials (test materials Nos. 3 to 7, and 10 and 11), unheated materials (test materials Nos. 1 and 8), and long-term heated materials (test materials Nos. 2 and 9) heated at 900° C. for 10,000 hours, microstructure, hardness, tensile, and creep rupture tests were conducted.

Table 3 collectively shows the classification of the used test materials, re-heat treatment conditions, and the like. Also, the test results are shown in FIGS. 1 to 6 and Tables 4 to 7.

TABLE 2

Chemical composition of experimental material used in example (wt %)

| Element | Cr | Co | Mo | W | Ta | Al | Ti | C | B |
|---|---|---|---|---|---|---|---|---|---|
| Alloy A | 14.0 | 9.9 | 1.4 | 4.5 | 4.8 | 4.2 | 2.7 | 0.08 | 0.01 |
| Alloy B | 15.9 | 8.4 | 1.6 | 2.5 | 1.8 | 3.6 | 3.4 | 0.1 | 0.008 |

| Element | Zr | Mg/Ca | Hf | Nb | Fe | Mn | Si | S | Ni |
|---|---|---|---|---|---|---|---|---|---|
| Alloy A | 0.014 | 5 ppm | 0.9 | — | — | — | — | — | Balance |
| Alloy B | 0.07 | — | — | 1.1 | 0.02 | 0.01 | 0.03 | 0.005 | Balance | jected to long-term heating of 900° C.×10,000 hours (test material No. 2), the creep rupture time decreased to 417 hours, and the creep rupture elongation decreased to 2.0%. Also, the reduction of area under the creep test condition of 850° C.×30 kg/mm², the creep rupture time, creep rupture elongation, and reduction of area under the creep test condition of 900° C.×20.5 kg/mm² also decreased as compared with those of the unheated material.

Figure 2:
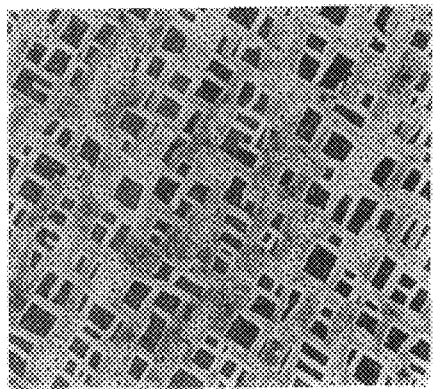
FIG. 2 is a microphotograph of ×5000 magnification showing a microstructure of a Ni-base heat resistant alloy (test material No. 1) before being subjected to heat history.
Figure 3:
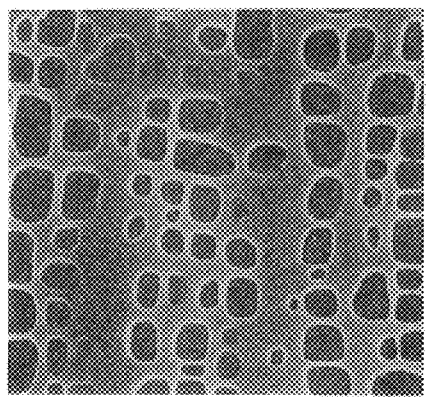
FIG. 3 is a microphotograph of ×5000 magnification showing a microstructure of a Ni-base heat resistant alloy (test material No. 2) after being subjected to heat history.

FIGS. 2 and 3 are microphotographs of ×5000 magnification showing microstructures of test materials. FIG. 2 shows the deposition state of the second phase of the unheated material (test material No. 1) and FIG. 3 shows that of the material subjected to long-term heating of 900° C.×10,000 hours (test material No. 2). In FIG. 2, the second phase having a square shape with one side of about 0.5 μm and having a diameter of 0.1 μm or smaller is deposited. In FIG. 3, the second phase having a square shape with one side of about 0.5 μm shown in FIG. 2 is changed to the second phase which has a particulate shape with a roundness, and is

TABLE 3

Prepared test material

| Alloy | Test material No. | Classification of test materials | | Re-heat treatment conditions etc. |
|---|---|---|---|---|
| Alloy A | 1 | Unheated material | | Heat treatment (1120° C. × 2h/air cooling + 850° C. × 24h/air cooling) in manufacturing |
| | 2 | Long-term heated material | | Unheated material (test material No. 1) is treated under condition of 900° C. × 10000h. |
| | 3 | Re-heat treated material | Comparative material | Test material No. 2 is treated under condition of 1120° C. × 2h/air cooling + 850° C. × 24h/air cooling. |
| | 4 | | | Test material No. 2 is treated under condition of 1150° C. × 2h/air cooling + 850° C. × 24h/air cooling. |
| | 5 | | | Test material No. 2 is treated under condition of 1200° C. × 2h/air cooling + 850° C. × 24h/air cooling. |
| | 6 | | | Test material No. 2 is treated under condition of 1150° C. × 2h/furnace cooling + 1120° C. × 2h/air cooling + 850° C. × 24h/air cooling. |
| | 7 | | Material of the present invention | Test material No. 2 is treated under condition of 1200° C. × 2h/furnace cooling + 1120° C. × 2h/air cooling + 850° C. × 24h/air cooling. |
| Alloy B | 8 | Unheated material | | Heat treatment (1120° C. × 2h/air cooling + 850° C. × 24h/air cooling) in manufacturing |
| | 9 | Long-term heated material | | Unheated material (test material No. 8) is treated under condition of 900° C. × 10000h. |
| | 10 | Re-heat treated material | Comparative material | Test material No. 9 is treated under condition of 1150° C. × 2h/furnace cooling + 1120° C. × 2h/air cooling + 850° C. × 24h/air cooling. |
| | 11 | | Material of the present invention | Test material No. 9 is treated under condition of 1200° C. × 2h/furnace cooling + 1120° C. × 2h/air cooling + 850° C. × 24h/air cooling. |

(1) Test of Alloy A

As shown in Table 4, for the unheated material (test material No. 1) of alloy A, the hardness was HV420, and the tensile strength and elongation at room temperature were 114.3 kg/mm² and 7.1%, respectively. When this material was subjected to long-term heating of 900° C.×10,000 hours (test material No. 2), the hardness decreased to HV362, and the tensile strength and elongation at room temperature decreased to 83.5 kg/mm² and 2.2%, respectively. Also, the 0.2% proof stress and the reduction of area at room temperature and the 0.2% proof stress, tensile strength, elongation, and reduction of area at 650° C. also decreased as compared with those of the unheated material.

As shown in Table 5, for the unheated material (test material No. 1) under the creep test condition of 850° C.×30 kg/mm², the creep rupture time was 838 hours, and the creep rupture elongation was 5.8%. When this material was subcoarsened, and the second phase having a diameter of 0.1 μm or smaller disappears. As shown in FIGS. 2 and 3, the changes of mechanical properties and creep rupture properties correspond to the change of microstructure, that is, the shape, particle diameter, and deposition amount of the deposited second phase. Therefore, it is found that in order to recover the mechanical properties and creep rupture properties, it is necessary to re-deposit the second phase having a square shape with one side of about 0.5 μm and having a diameter of 0.1 μm or smaller by the aging treatment after the second phase coarsened into a particle shape is re-solid dissolved by solution treatment.

For this reason, the material subjected to heating of 900° C.×10,000 hours (test material No. 2) was subjected to the first-stage solution treatment, in which the material is held at a temperature of 1120° C., 1150° C. and 1200° C. for 2 hours and then is air-cooled, and thereafter was subjected to the aging treatment, in which the material is held at a temperature 850° C. for 24 hours and then is air-cooled (test materials Nos. 3, 4 and 5). The microphotographs of ×5000 magnification of these materials are shown in FIGS. 4 to 6, and the hardness and tensile test results thereof are shown in Table 4.

Figure 4:
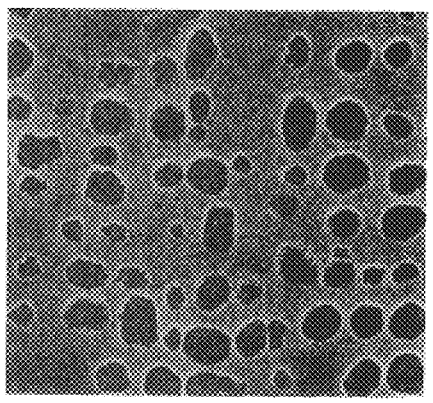
FIG. 4 is a microphotograph of ×5000 magnification showing a microstructure of a Ni-base heat resistant alloy (test material No. 3) subjected to predetermined heat treatment after its property is deteriorated by being subjected to heat history.

In the microstructure shown in FIG. 4, the second phase, in which the particle is coarsened, of FIG. 3 is scarcely re-solid dissolved, and the second phase with a diameter of 0.05 μm or smaller is slightly re-deposited. In the microstructure shown in FIG. 5, almost half the number of second phases, in which the particle is coarsened, are re-solid dissolved, and the second phase with a diameter of 0.08 μm or smaller is re-deposited in slightly large numbers. In the microstructure shown in FIG. 6, all of the second phases, in which the particle is coarsened, are re-solid dissolved, and only the second phase with a diameter of 0.1 μm or smaller is re-deposited in large numbers. The ductility (elongation) of the test materials Nos. 3, 4 and 5 having these microstructures is 3.5%, 2.9% and 2.7%, respectively, which ductility is not recovered to 7.1%, the value of the unheated material.

Figure 5:
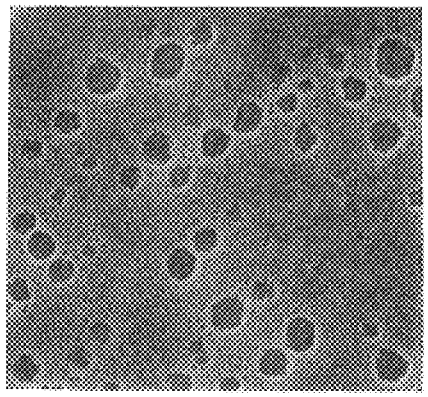
FIG. 5 is a microphotograph of ×5000 magnification showing a microstructure of a Ni-base heat resistant alloy (test material No. 4) subjected to predetermined heat treatment after its property is deteriorated by being subjected to heat history.
Figure 6:
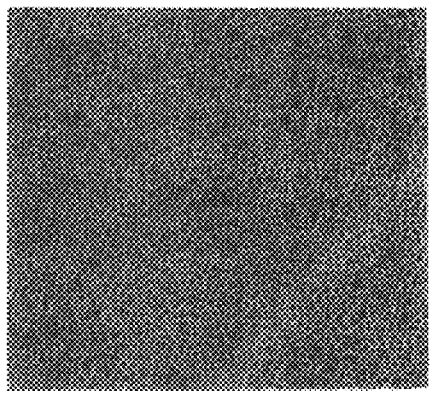
FIG. 6 is a microphotograph of ×5000 magnification showing a microstructure of a Ni-base heat resistant alloy (test material No. 5) subjected to predetermined heat treatment after its property is deteriorated by being subjected to heat history.

From FIGS. 4 to 6 and Table 4, it is found that the hardness and tensile strength of the material subjected to the first-stage solution treatment at a temperature of 1120° C., 1150° C. and 1200° C. are recovered to the values equal to or higher than those of the unheated material, but the microstructure and ductility (elongation and reduction of area) are not recovered.

Thus, the material subjected to heating of 900° C.×10,000 hours (test material No. 2) was subjected to two-stage solution treatment of 1200° C.×2 hr/furnace cooling+1120° C.×2 hr/air cooling (after being held at 1200° C. for 2 hours, the material is furnace-cooled to room temperature, and then heated to 1120° C. again and held for 2 hours, thereafter being air-cooled to room temperature), which is a treatment method of the present invention, and then subjected to the aging treatment of 850° C.×24 hr/air cooling. The microphotograph of ×5000 magnification of this treated material (test material No. 7) is shown in FIG. 1, the hardness and tensile test results thereof are shown in Table 4, and the creep rupture test results thereof are shown in Table 5. From these figure and tables, it is found that by performing heat treatment of 1200° C.×2 hr/furnace cooling+1120° C.×2 hr/air cooling+850° C.×24 hr/air cooling on alloy A whose properties such as strength and ductility have been decreased by the long-term heating at a high temperature or the long-term use at a high temperature, all of the microstructure, mechanical properties, and creep rupture properties are recovered to the values equal to or higher than those of the unheated material (test material No. 1).

Test material No. 6 in Table 3 is, like No.7 which is the material of the present invention, subjected to two-stage solution treatment and aging treatment, so that the degree of recovery is higher than that of the materials subjected to one-stage solution treatment as shown in Tables 4 and 5. However, since the first-stage solution treatment temperature is as low as 1150° C., the recovery of ductility is still insufficient.

(2) Test of Alloy B

As shown in Table 6, for the unheated material (test material No. 8) of alloy B, the hardness was HV384, and the tensile strength and elongation at room temperature were 87.2 kg/mm$^2$ and 7.8%, respectively. When this material was subjected to long-term heating of 900° C.×10,000 hours (test material No. 9), the hardness decreased to HV325, and the tensile strength and elongation at room temperature decreased to 81.5 kg/mm$^2$ and 1.7%, respectively. Also, the 0.2% proof stress and the reduction of area at room temperature and the 0.2% proof stress, tensile strength, elongation, and reduction of area at 650° C. also decreased as compared with those of the unheated material.

As shown in Table 7, for the unheated material (test material No. 8) under the creep test condition of 760° C.×50.5 kg/mm$^2$, the creep rupture time was 183 hours, and the creep rupture elongation was 7.6%. When this material was subjected to long-term heating of 900° C.×10,000 hours (test material No. 9), the creep rupture time decreased to 96 hours, and the creep rupture elongation decreased to 3.1%. Also, the reduction of area under the creep test condition of 760° C.×50.5 kg/mm$^2$, the creep rupture time, creep rupture elongation, and reduction of area under the creep test condition of 980° C.×11.5 kg/mm$^2$, also decreased as compared with those of the unheated material.

The heated material (test material No. 9) subjected to heating of 900° C.×10,000 hours, whose strength and ductility have decreased as described above, was, as in the case of alloy A, subjected to two-stage solution treatment and aging treatment to prepare test material No. 11. For this test material No. 11, hardness test, tensile test, and creep rupture test were conducted. The test results are shown in Tables 6 and 7. From these tables, it is found that by performing heat treatment of 1200° C.×2 hr/furnace cooling+1120° C.×2 hr/air cooling+850° C.×24 hr/air cooling on alloy B whose properties such as strength and ductility have been decreased by the long-term heating at a high temperature or the long-term use at a high temperature, as in the case of alloy A, the mechanical properties and creep rupture properties are recovered to the values equal to or higher than those of the unheated material (test material No. 8).

Test material No. 10 in Table 3 is, like No.11 which is the material of the present invention, subjected to two-stage solution treatment. As shown in Tables 6 and 7, since the first-stage solution treatment temperature is as low as 1150° C., the recovery of ductility is still insufficient.

TABLE 4

Results of hardness and tensile tests of alloy A

| Test material | | Vickers hardness | Tensile properties at room temperature | | | | Tensile properties at 650° C. | | | |
|---|---|---|---|---|---|---|---|---|---|---|
| | | | 0.2% proof stress | Tensile strength | Elongation | Reduction of area | 0.2% proof stress | Tensile strength | Elongation | Reduction of area |
| No. | Classification | (HV) | kg/mm$^2$ | kg/mm$^2$ | % | % | kg/mm$^2$ | kg/mm$^2$ | % | % |
| 1 | Unheated material | 420 | 99.7 | 114.3 | 7.1 | 7.4 | 87.0 | 121.6 | 9.8 | 11.6 |
| 2 | Heated material | 362 | 70.3 | 83.5 | 2.2 | 3.4 | 62.7 | 80.4 | 4.2 | 5.8 |

TABLE 4-continued

Results of hardness and tensile tests of alloy A

| Test material | | Vickers hardness | Tensile properties at room temperature | | | | Tensile properties at 650° C. | | | |
|---|---|---|---|---|---|---|---|---|---|---|
| | | | 0.2% proof stress | Tensile strength | Elonga-tion | Reduction of area | 0.2% proof stress | Tensile strength | Elonga-tion | Reduction of area |
| No. | Classification | (HV) | kg/mm² | kg/mm² | % | % | kg/mm² | kg/mm² | % | % |
| 3 | Comparative material | 425 | 98.5 | 113.1 | 3.5 | 3.6 | 84.2 | 119.5 | 4.7 | 6.2 |
| 4 | Comparative material | 451 | 108.2 | 123.6 | 2.9 | 3.2 | 91.5 | 128.8 | 3.6 | 4.5 |
| 5 | Comparative material | 471 | 116.1 | 129.7 | 2.7 | 2.9 | 103.4 | 132.3 | 3.2 | 4.4 |
| 6 | Comparative material | 427 | 98.8 | 114.3 | 5.3 | 5.7 | 85.1 | 118.4 | 5.6 | 6.3 |
| 7 | Inventive material | 430 | 100.3 | 115.2 | 8.2 | 7.6 | 89.2 | 122.9 | 9.0 | 10.8 |

TABLE 5

Results of creep rupture test of alloy A

| Test material | | Test conditions | | Creep rupture properties | | |
|---|---|---|---|---|---|---|
| | | Temperature | Stress | Rupture time | Elongation | Reduction of |
| No. | Classification | ° C. | kg/mm² | h | % | area % |
| 1 | Unheated material | 850 | 30 | 838 | 5.8 | 6.2 |
| 2 | Heated material | | | 417 | 2.0 | 3.0 |
| 7 | Inventive material | | | 820 | 5.7 | 6.0 |
| 1 | Unheated material | 900 | 20.5 | 1097 | 6.3 | 8.9 |
| 2 | Heated material | | | 719 | 3.2 | 4.0 |
| 5 | Comparative material | | | 732 | 3.7 | 4.3 |
| 6 | Comparative material | | | 896 | 5.2 | 5.7 |
| 7 | Inventive material | | | 1123 | 6.4 | 9.2 |

40

TABLE 6

Results of hardness and tensile tests of alloy B

| Test material | | Vickers hardness | Tensile properties at room temperature | | | | Tensile properties at 650° C. | | | |
|---|---|---|---|---|---|---|---|---|---|---|
| | | | 0.2% proof stress | Tensile strength | Elonga-tion | Reduction of area | 0.2% proof stress | Tensile strength | Elonga-tion | Reduction of area |
| No. | Classification | (HV) | kg/mm² | kg/mm² | % | % | kg/mm² | kg/mm² | % | % |
| 8 | Unheated material | 384 | 80.9 | 87.2 | 7.8 | 8.7 | 74.6 | 89.3 | 9.1 | 11.5 |
| 9 | Heated material | 325 | 70.1 | 81.5 | 1.7 | 2.2 | 65.7 | 83.8 | 3.3 | 4.1 |
| 10 | Comparative material | 376 | 72.1 | 83.4 | 5.1 | 6.0 | 69.7 | 86.7 | 5.9 | 6.8 |
| 11 | Inventive material | 394 | 81.3 | 88.7 | 8.2 | 8.9 | 74.5 | 90.4 | 9.8 | 12.4 |

TABLE 7

Results of creep rupture test of alloy B

| Test material | | Test conditions | | Creep rupture properties | | |
|---|---|---|---|---|---|---|
| No. | Classification | Temperature °C. | Stress kg/mm² | Rupture time h | Elongation % | Reduction of area % |
| 8 | Unheated material | 760 | 50.5 | 183 | 7.6 | 8.4 |
| 9 | Heated material | | | 96 | 3.1 | 3.9 |
| 11 | Inventive material | | | 197 | 7.4 | 8.5 |
| 8 | Unheated material | 980 | 11.5 | 158 | 8.2 | 8.7 |
| 9 | Heated material | | | 84 | 3.9 | 4.1 |
| 10 | Comparative material | | | 110 | 5.2 | 5.8 |
| 11 | Inventive material | | | 149 | 8.5 | 9.3 |

What is claimed is:

1. A property recovering method for a Ni-base heat resistant alloy, in which a Ni-base heat resistant alloy containing, in percent by weight, 13.1–15% Cr, 8.5–10.5% Co, 1–3.5% Mo, 3.5–4.5% W, 3–5.5% Ta, 3.5–4.5% Al, 2.2–3.2% Ti, 0.06–0.12% C, 0.025% or less B, 0.01–0.05% Zr, 1–100 ppm Mg and/or Ca, and 0–1.5% Hf, the balance being Ni and unavoidable impurities, whose properties have been deteriorated by heat history, is subjected to first-stage solution treatment, in which the alloy is held at a temperature of 1175 to 1225° C. for 1 to 5 hours and then furnace-cooled, then subjected to second-stage solution treatment, in which the alloy is held at a temperature of 1115 to 1165° C. for 1 to 5 hours and then air-cooled, and further subjected to aging treatment, in which the alloy is held at a temperature of 810 to 860° C. for 22 to 26 hours.

2. A property recovering method for a Ni-base heat resistant alloy, in which a Ni-base heat resistant alloy containing, in percent by weight, 15.7–16.3% Cr, 8–9% Co, 1.5–2% Mo, 2.4–2.8% W, 1.5–2% Ta, 3.2–3.7% Al, 3.2–3.7% Ti, 0.09–0.13% C, 0.007–0.012% B, 0.03–0.08% Zr, 0.6–1.1% Nb, 0.05% or less Fe, 0.02% or less Mn, 0.3% or less Si, and 0.015% or less S (where Al+Ti: 6.5–7.2%), the balance being Ni and unavoidable impurities, whose properties have been deteriorated by heat history, is subjected to first-stage solution treatment, in which the alloy is held at a temperature of 1175 to 1225° C. for 1 to 5 hours and then furnace-cooled, then subjected to second-stage solution treatment, in which the alloy is held at a temperature of 1115 to 1165° C. for 1 to 5 hours and then air-cooled, and further subjected to aging treatment, in which the alloy is held at a temperature of 810 to 860° C. for 22 to 26 hours.

3. A method for recovering material properties of a member comprising a nickel-base heat resistant alloy having deteriorated material properties due to use at high temperatures, the alloy having a second phase including a γ' intermetallic $Ni_3$ (Al, Ta, Ti) compound, said method comprising the steps:

subjecting the member to a first-stage solution treatment at a temperature of between about 1175° C. and about 1225° C. for a time of at least 1 hour;

subjecting the member to a second stage solution treatment at a temperature of between about 1115° C. and about 1165° C. for a time of between about 1 hour and about 5 hours; and subjecting the member to an aging treatment at a temperature of between about 810° C. and about 860° C. for a time of between about 22 hours and about 26 hours.

4. A method according to claim 3 wherein said member comprises a gas turbine blade.

5. A method according to claim 3 wherein said member comprises a jet engine blade.

6. A method according to claim 3 further including the step of furnace-cooling the member following the first stage solution treatment and prior to the second stage solution treatment.

7. A method according to claim 3 further including the step of air-cooling the member following the second stage solution treatment and prior to the aging treatment.

8. A method according to claim 3 further including the step of air-cooling the member following the aging treatment.

9. A method according to claim 3 wherein the nickel-base heat resistant alloy contains, in percent by weight, 13.1–15% Cr, 8.5–10.5% Co, 1–3.5% Mo, 3.5–4.5% W, 3–5.5% Ta, 3.5–4.5% Al, 2.2–3.2% Ti, 0.06–0.12% C, 0.025% or less B, 0.01–0.05% Zr, 1–100 ppm Mg and/or Ca, and 0–1.5% Hf, the balance being Ni and unavoidable impurities.

10. A method according to claim 3 wherein the nickel-base heat resistant alloy contains, in percent by weight, 15.7–16.3% Cr, 8–9% Co, 1.5–2% Mo, 2.4–2.8% W, 1.5–2% Ta, 3.2–3.7% Al, 3.2–3.7% Ti, 0.09–0.13% C, 0.007–0.012% B, 0.03–0.08% Zr, 0.6–1.1% Nb, 0.05% or less Fe, 0.02% or less Mn, 0.3% or less Si, and 0.05% or less S (where Al+Ti: 6.5–7.2%), the balance being Ni and unavoidable impurities.

* * * * *